Patented Sept. 27, 1932

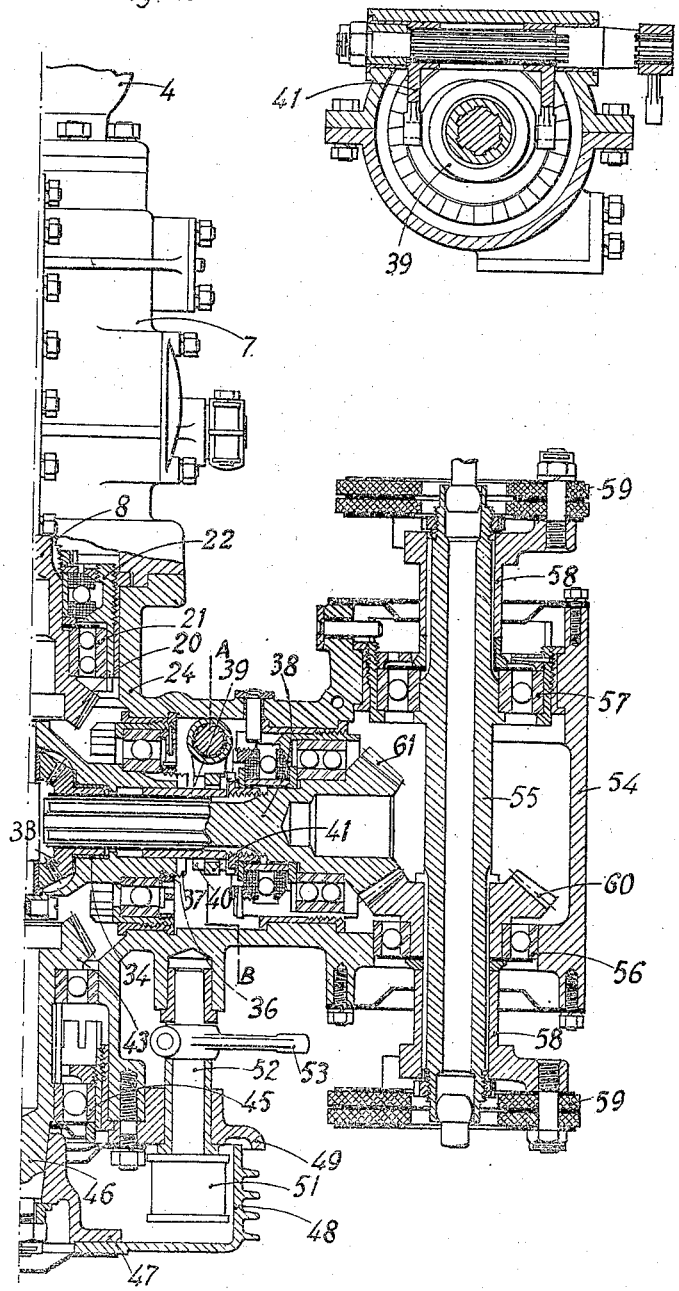

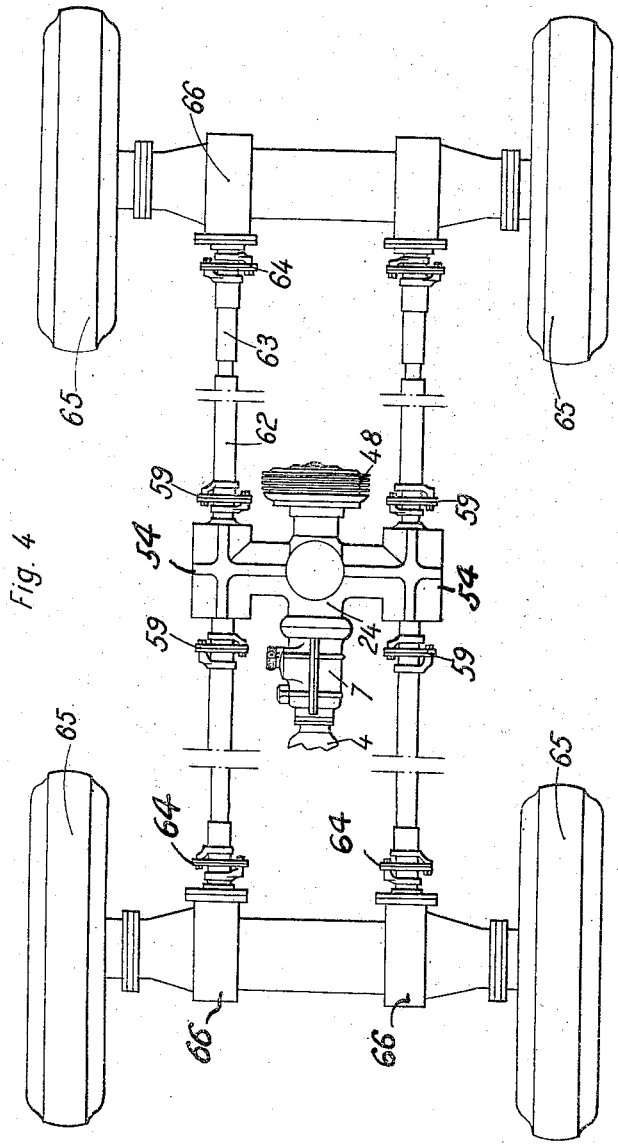

1,879,044

UNITED STATES PATENT OFFICE

MARIUS BERLIET, OF LYON, FRANCE, ASSIGNOR TO SOCIETE ANONYME DES AUTOMOBILES M. BERLIET, OF LYON, FRANCE

MEANS FOR OPERATION OF MOTOR VEHICLES

Application filed September 28, 1929, Serial No. 395,944, and in France October 1, 1928.

The present invention relates to improvements in means for the operation of motor vehicles having several driving wheels, and it particularly concerns a device for central control by which the motion is imparted to vehicles having four driving wheels, said device being mounted at the end of the transmission speed casing.

The said device comprises a speed transmission by which the number of speeds can be doubled, and which is followed by the mechanism acting upon the differential provided with a blocking device, also comprising bevel gearing for the operation of the shafts driving the wheels, as well as a brake mechanism disposed upon a separate shaft.

The said apparatus is contained in a casing of cruciform-shape having tubular horizontally disposed branches. One end of the large longitudinal branch is secured to the rear end of the transmission casing, and contains the speed change gear, which is connected to a differential, known per se, and is inserted into a central recess, disposed at the intersection of the horizontal branches and the transverse branches of the casing. The transverse branches contain the shafts of the differential gearing which actuate— by bevel gearing—the lined shafts in lateral disposition which drive the wheels, and the large longitudinal branch is terminated beyond the cross branches, and contains the shaft of the brake acting upon the mechanism.

The said invention is particularly specified with reference to the accompanying drawings, in which:

Figure 1 is a vertical longitudinal sectional view on the axis of the mechanism.

Figure $2^1$ is a part sectional view, and

Fig. $2^2$ is a similar view of the remaining organization.

Figure 3 is a section on the line A—B of Figure 2, showing the parts which hold the differential in the fixed position.

Figure 4 is a top plan view of the device.

Figure 1:
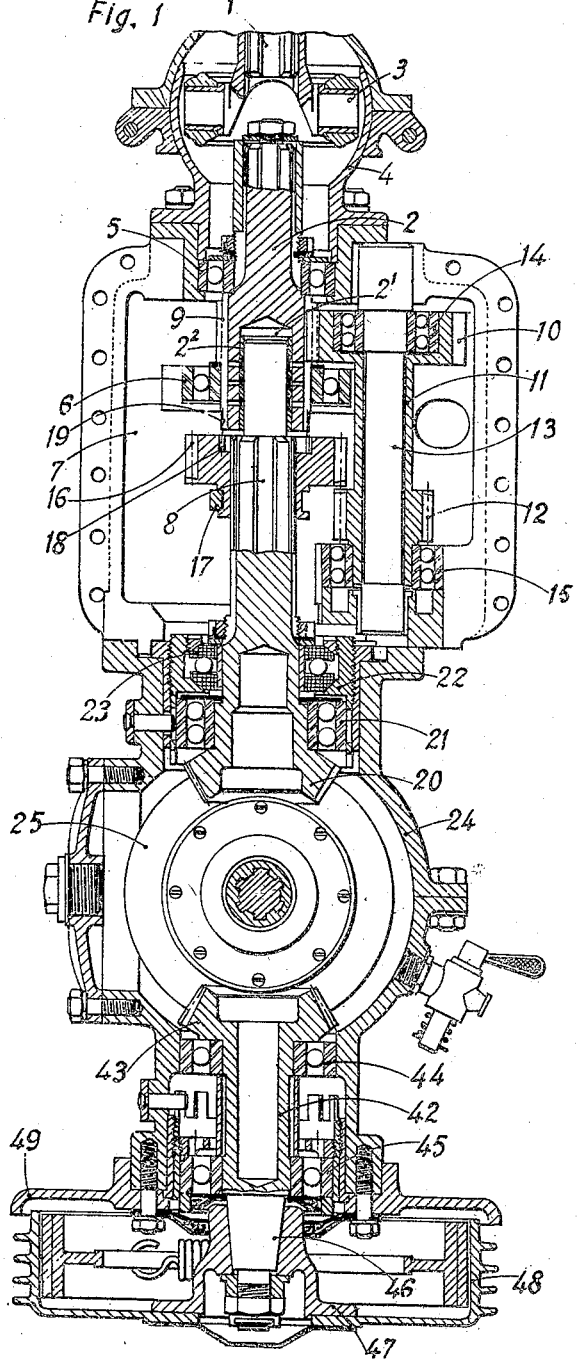

The motion to be transmitted to the vehicle wheels is imparted to the speed transmission in the casing by the shaft 1 from which it is transmitted to the main shaft 2 by means of the universal joint 3 disposed in a casing 4. The shaft 2 is maintained in ball-bearing 5—6 disposed in a two-part casing which contains the speed-reduction mechanism. The rear end of the shaft 2 is bored at $2^1$ to form a recess for the insertion of the end of the shaft 8 actuating the differential device. A ring $2^2$ is interposed between the shafts 2 and 8, as shown in Figure 1, and the two shafts are fitted together at a point adjacent the said ball bearing 6 whereby the device is accurately centered.

The speed-reduction gear in the casing 7 consists of teeth 9 on the end of the shaft 2 in constant engagement with a pinion 10 of larger diameter mounted on an intermediate tubular shaft 11, which carries on the other end a pinion 12, smaller than the pinion 10. The shaft 11 is loose on the spindle 13 which is contained in the casing 7, with the interposition of ball-bearings 14 and 15. The pinion 12 may be engaged with a pinion 16 movable in grooves formed in the shaft 8, in line with the shaft 2 and actuating the differential device. The pinion 16 is moved in the known manner by a fork 17, and it also comprises internal teeth 18 cooperating with the external teeth 19 on the end of the shaft 2.

As regards the operation of the fork 17, the teeth 18 of the pinion 16 engage the teeth 19 of the shaft 2, thus obtaining the direct drive, and herein the shaft 8 is driven at the same speed as the shaft 2; but when the pinion 16 is engaged with the pinion 12, the speed of the shaft 8 is reduced relatively to the said shaft, due to the ratio of the gearing 9—10—12—16.

The shaft 8 actuating the said differential device is terminated by a bevel pinion 20 which is forged together with the end of the said shaft. The shaft 8 is mounted in a ball bearing 21 secured in a casing 22 in which is mounted a ball-shaped face 23 supporting the reaction. The casing 22 is mounted in such manner as to be suitably adjusted in the casing 24 of the differential.

The pinion 20 of the shaft 8 drives a bevel gear 25 mounted on a sleeve 26 situated to the left of the differential mechanism and secured to the casing 29 of the said differential. Between the casing and the ring 25 is mounted a ball-bearing 27. The ring 25 carries internal teeth 28 adapted to drive the case 29 of the said differential, by means of teeth 30 formed on the sleeve 26. The said differential operates in the known manner, by reason of its planetary pinions 31 mounted on axles disposed in the case 29, and by the use of the main cooperating gear wheels 33. The said wheels 33 are engaged by their external hubs with the sleeves 26 of the said case, with the interposition of the rings 34. The hubs of the said main gear wheels are suitably grooved to cooperate with the ends of the differential shaft 35—38.

Figure 2:
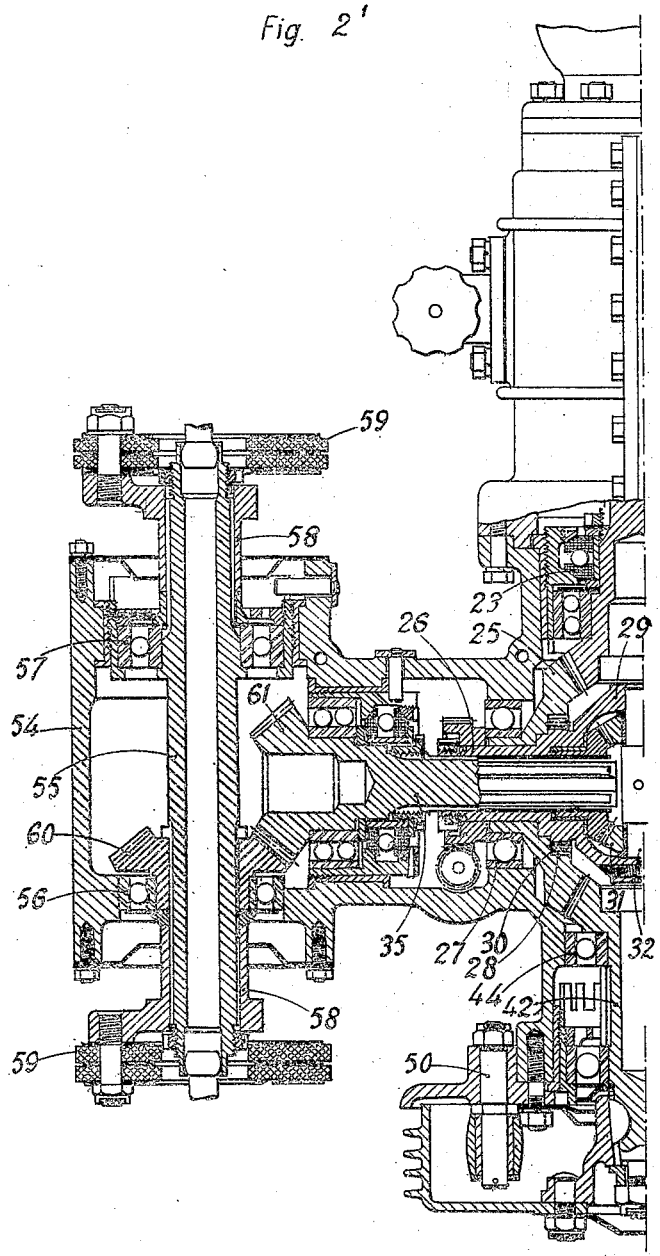

The sleeve end 36 upon the right hand side of the differential is provided with teeth 37, and upon the grooved part of the right hand differential shaft 38 is mounted a slidable collar 39 carrying a tooth 40 cooperating with the teeth 37 of the sleeve 36 of the said case 29, by means of the fork 41, in order to hold the differential, as shown in Figures 2 and 3.

The clutch 39, 40 causes the shaft 38 which is fixed with the part 36 of the member 29 and the case 29 and the shaft 38 to have the same motion about the axis of the shaft 38, and the planetary pinions 31 will remain stationary with respect to the wheel 33. The differential is thus held since the vehicle must have the possibility of running on all grounds and it happens frequently that two wheels placed on the said side slide and turn idle on uneven ground, whereas the others placed on the other side are on hard or even ground but will remain stationary due to the effect of the differential; if the differential is then held the wheels which are on hard ground will drive the vehicle.

In line with the shaft 8 and outside the said differential, the casing 24 is extended for the insertion of the shaft 42 on the inner end of which is mounted a bevel gear 43 cooperating with the gear 25. The shaft 42 is held in the casing 24 by ball-bearings 44—45, and at its rear end is a tapered part 46 upon which is keyed a disk 47 secured to a brake drum 48.

On the casing 24 is mounted a circular disk 49 to which is secured the pivot axle 50 of the brake shoes as well as the axle 52 of the brake cam 51. The axle 52 is operated by a lever 53 and is mounted at the other end from the cam 51 in a recess in the casing 24.

The transverse portions of the casing 24 containing the differential shafts 35 and 38 are terminated by the lateral cylindrical casings 54 containing—through the medium of the ball bearings 56 and 57—the longitudinal shafts 55 which are grooved at the ends and thus cooperate with the sleeves 58 to which are bolted flexible connecting members 59, by which the shafts of the four driving wheels 65 may be driven.

The shafts 62 are connected with the joints 59 and are telescopically engaged in the shafts 63, which in turn are connected with the flexible couplings 64. The casings 66 are mounted on the axles and in which suitable gears are located for transmitting power to the axles for driving the wheels 65.

The shafts 55 are driven by bevel gears 60 mounted on the rear grooved portions and in the ball bearings 56, said gears being in constant engagement with the bevel gears 61 forged at the ends of the said differential shafts 35—38.

The operation is as follows:

The motion of the shaft 1 extending from the speed-transmission casing is imparted to the driving shaft 2 by the universal joint 3 which thus drives the shaft 8 of the differential, or a direct drive may be used when the internal teeth 18 of the pinion 16 engage the teeth 19 of the shaft 2, or the same may operate by the use of the speed-reducing shaft 11 when the pinion 16 engages the pinion 12. The shaft 8 actuates the differential device by its said pinion 20 which is in constant engagement with the ring 25 which drives the case 29 by means of the teeth 28—30. The main gear wheels 31 and the planetary gear wheels 33 will in turn drive the shafts of the differentials 35—38, and these, by means of their bevel pinions 61 cooperating with the pinions 60 will drive the longitudinal shafts 55 controlling the four vehicle wheels.

I claim:

1. A four-wheel drive for vehicles comprising a speed transmission, a differential mechanism driven by the shaft thereof, said differential mechanism including shafts, shafts extending at right angles to the outer ends of the differential shafts and driven thereby and adapted to transmit movement to the wheels of the vehicle, a shaft alined with the transmission shaft and geared with the differential mechanism, and a braking mechanism connected with the latter shaft.

2. A four-wheel drive for vehicles comprising a speed transmission, a casing of cruciform shape, a differential mechanism in said casing driven by the shaft of the transmission and extending through one branch of the casing, a shaft alined with the transmission shaft and geared with the differential mechanism, said shaft being journaled in one branch of the casing, the shafts of the differential mechanism being journaled in the lateral branches of the casing, wheeled driving shafts extending at right angles to the shafts of the differential mechanism and geared thereto, and a braking mechanism associated with the shaft alined with the transmission shaft.

3. A four-wheeled drive for vehicles including a casing of cruciform shape, a differential mechanism mounted in the casing at the juncture of the branches thereof, a speed-change transmission including a shaft, said shaft being journaled in one longitudinal branch of the casing, a brake shaft alined therewith and journaled in the other longitudinal branch of the casing, the shafts of the differential mechanism being journaled in the lateral branches of the casing, wheeled driving shafts disposed at right angles to the differential shaft and driven thereby to impart movement to the wheels of the vehicle.

4. A four-wheel drive for vehicles comprising a speed-change transmission, a differential mechanism, said differential mechanism including a casing driven by the shaft of the transmission, the shafts of the differential mechanism being adapted to drive the wheels of the vehicle, said casing having teeth upon one end, a nonrotatable collar slidable on the differential shaft adjacent the teeth and having teeth thereon for engaging the teeth of the casing, and means for sliding the collar to cause engagement of said teeth, as and for the purpose set forth.

In testimony whereof he has signed this specification.

MARIUS BERLIET.